United States Patent
Yeo et al.

(10) Patent No.: US 9,819,466 B2
(45) Date of Patent: Nov. 14, 2017

(54) METHOD AND APPARATUS FOR RETRANSMITTING PACKET FOR LOW-POWER WIRELESS SENSOR COMMUNICATIONS

(71) Applicant: Electronics and Telecommunications Research Institute, Daejeon-si (KR)

(72) Inventors: Geon-Min Yeo, Daejeon-si (KR); Young-Il Kim, Daejeon-si (KR); Won Ryu, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 114 days.

(21) Appl. No.: 14/571,769

(22) Filed: Dec. 16, 2014

(65) Prior Publication Data
US 2015/0172031 A1    Jun. 18, 2015

(30) Foreign Application Priority Data

Dec. 17, 2013   (KR) .......................... 10-2013-0157097

(51) Int. Cl.
*H04W 72/04*      (2009.01)
*H04L 12/28*      (2006.01)
(Continued)

(52) U.S. Cl.
CPC .......... *H04L 5/0055* (2013.01); *H04L 1/1614* (2013.01); *H04W 74/04* (2013.01); *H04W 84/18* (2013.01); *Y02B 60/50* (2013.01)

(58) Field of Classification Search
CPC ....... H04L 5/00; H04L 1/1614; H04L 5/0055; H04L 12/28; H04W 74/04; H04W 88/06;
(Continued)

(56) References Cited

U.S. PATENT DOCUMENTS

2007/0184864 A1*  8/2007  Leitch ............... H04W 56/0015
                                                    455/507
2007/0277074 A1* 11/2007  Yeo ....................... H04L 1/1614
                                                    714/749
(Continued)

FOREIGN PATENT DOCUMENTS

KR         10-1243321 B1      3/2013

OTHER PUBLICATIONS

Zhou, Y., et al., "A Low-latency GTS Strategy in IEEE802.15.4 for Industrial Applications,"Proceedings from the Second International Conference on Future Generation Communication and Networking (FGCN'08), held on Dec. 13-15, 2008, Hainan Island, (4 pages, in English).

(Continued)

*Primary Examiner* — Edan Orgad
*Assistant Examiner* — Vanneilian Lalchinthang
(74) *Attorney, Agent, or Firm* — NSIP Law

(57) ABSTRACT

A method of retransmitting a packet for low-power wireless sensor communications of a coordinator in a sensor network is provided. The method includes receiving packets from a plurality of sensor devices during a plurality of guaranteed time slots (GTSs) of a Contention Free Period (CFP) which are allocated to the respective sensor devices; checking whether there is an error in each of the received packets; generating one GTS Bulk ACK frame that contains pieces of ACK information to be transmitted to the respective sensor devices, according to the error check results; and transmitting the generated GTS Bulk ACK frame to the plurality of sensor devices.

17 Claims, 11 Drawing Sheets

(51) Int. Cl.
*H04L 5/00* (2006.01)
*H04W 74/04* (2009.01)
*H04L 1/16* (2006.01)
*H04W 84/18* (2009.01)

(58) Field of Classification Search
CPC ... H04W 84/18; H04W 72/04; H04W 76/007; Y02B 60/50
USPC ........................................................ 370/329
See application file for complete search history.

(56) References Cited

U.S. PATENT DOCUMENTS

| | | | |
|---|---|---|---|
| 2008/0253327 A1* | 10/2008 | Kohvakka | H04W 16/14 370/330 |
| 2008/0253328 A1* | 10/2008 | Sahinoglu | H04W 74/02 370/330 |
| 2009/0238160 A1* | 9/2009 | Bhatti | H04L 1/1614 370/338 |
| 2011/0158206 A1* | 6/2011 | Shrestha | G01D 21/00 370/336 |
| 2011/0164605 A1* | 7/2011 | Zhen | H04W 52/0216 370/347 |
| 2012/0063389 A1* | 3/2012 | Abedi | H04L 45/28 370/328 |
| 2012/0106397 A1* | 5/2012 | Abedi | H04W 74/0875 370/255 |
| 2012/0230205 A1* | 9/2012 | An | H04W 28/044 370/242 |

OTHER PUBLICATIONS

IEEE Standards Association "Part 15.4: Low-Rate Wireless Personal Area Networks (LR-WPANs)," IEEE Computer Society, Sep. 5, 2011 (314 pages, in English).

* cited by examiner

FIG. 2
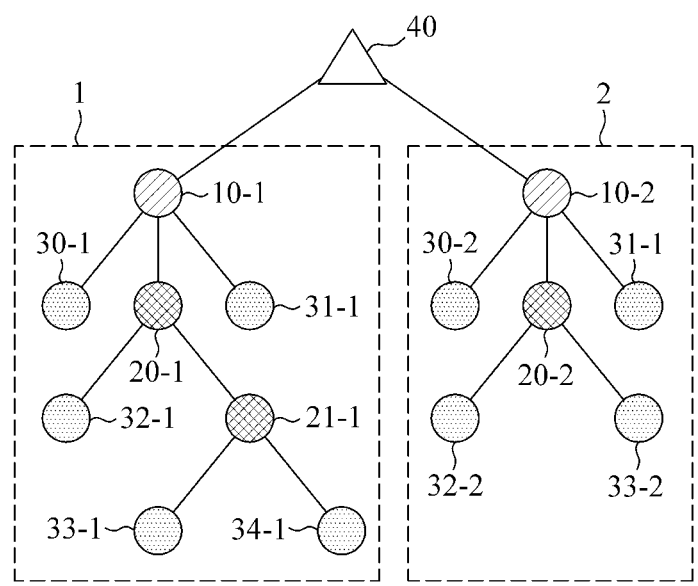
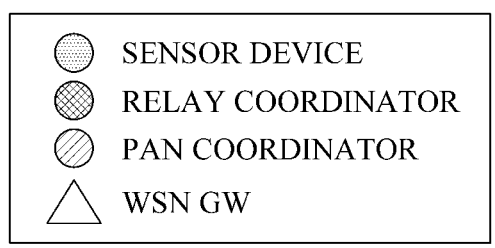

FIG. 7

GTS Bulk ACK MAC PDU ~401

| Frame Type | Source PAN Identifier | Source Coordinator Address | Number of Rx GTS | GTS ACK Bitmap | FCS |
|---|---|---|---|---|---|
| 302 | 313 | 314 | 303 | 304 | |

METHOD AND APPARATUS FOR RETRANSMITTING PACKET FOR LOW-POWER WIRELESS SENSOR COMMUNICATIONS

CROSS-REFERENCE TO RELATED APPLICATION(S)

This application claims priority from Korean Patent Application No. 10-2013-0157097, filed on Dec. 17, 2013, in the Korean Intellectual Property Office, the disclosure of which is incorporated herein by reference in its entirety.

BACKGROUND

1. Field

The following description relates to sensor communication service technologies, and more particularly, to methods and apparatuses for retransmitting a packet for sensor communications.

2. Description of the Related Art

A sensor network is a type of wireless network to transport sensing information generated by sensors to a final destination via wireless communications. Based on a low data transfer rate, as compared to mobile telecommunications network, the sensor network is generally operated on battery due to an environment difficult for supplying power in a wired manner.

In addition, as operated in a condition with a limited power, the sensor network has limited transmission wave intensity, resulting in forming of a short range of radio wave coverage. Thus, a low-power transmission mechanism is required for the sensor network to transmit data to a final destination.

Under such situations, IEEE802.15.4 has suggested guaranteed time slot (GTS) allocation and acknowledgement schemes, in which GTS ACK is operated, based on contentions, using CSMA-CA, during a Contention Access Period (CAP) and ACK for GTS transmission is carried out for each GTS, and thereby a probability of collisions is increased when using the CAP. As a result, ACK latency is caused, which leads to a latency delay in retransmission and increases the retransmission time. Further, a sensor device needs to stand by to receive ACKs independently transmitted by a coordinator during CAPs, thereby consuming a large amount of power.

SUMMARY

The following description relates to a method and apparatus for retransmitting a packet for low-power wireless sensor communications to reduce a retransmission time by preventing ACK latency delay.

In addition, the following description relates to a method and apparatus for retransmitting a packet for low-power wireless sensor communications, which are capable of low-power retransmission by reducing signal over-header, minimizing power consumption of a device on standby to receive an ACK, and at the same time avoiding any possible collisions.

In one general aspect, there is provided a method of retransmitting a packet for low-power wireless sensor communications, the method including: receiving packets from a plurality of sensor devices during a plurality of guaranteed time slots (GTSs) of a Contention Free Period (CFP) which are allocated to the respective sensor devices; checking whether there is an error in each of the received packets; generating one GTS Bulk ACK frame that contains pieces of ACK information to be transmitted to the respective sensor devices, according to the error check results; and transmitting the generated GTS Bulk ACK frame to the plurality of sensor devices.

In another general aspect, there is provided a method of retransmitting a packet for low-power wireless sensor communications, the method including: receiving one guaranteed time slot (GTS) Bulk ACK frame containing ACK information to be transmitted to each of a plurality of devices; checking the received GTS Bulk ACK frame and determining whether packet retransmission is required; and in response to a determination that the packet retransmission is required, retransmitting a corresponding packet during an allocated GTS within a Contention Free Period (CFP) offset.

In yet another general aspect, there is provided an apparatus for retransmitting a packet for low-power wireless sensor communications, the apparatus including: a packet receiver configured to receive packets transmitted from a plurality of sensor devices during guaranteed time slots (GTSs) of a Contention Free Period (CFP) offset which are allocated to each of the plurality of sensor devices; an error checker configured to check whether there is an error in each of the received packets; an ACK generator configured to, in response to an error check result, generate one GTS Bulk ACK frame containing ACK information to be transmitted to each of the plurality of sensor devices; and an ACK transmitter configured to transmit the generated GTS Bulk ACK frame to the plurality of sensor devices.

In another general aspect, there is provided an apparatus for retransmitting a packet for low-power wireless sensor communications, the apparatus including: an ACK receiver configured to receive one guaranteed time slot (GTS) Bulk ACK frame containing ACK information to be transmitted to each of a plurality of devices; a checker configured to check the received GTS Bulk ACK frame and determine whether packet retransmission is required; and a re-transmitter configured to, in response to a determination that the packet retransmission is required, retransmitting a corresponding packet during an allocated GTS within a Contention Free Period (CFP) offset.

Other features and aspects will be apparent from the following detailed description, the drawings, and the claims.

BRIEF DESCRIPTION OF THE DRAWINGS

FIG. 2 is a diagram illustrating an example of a configuration of a hierarchical sensor network.

FIG. 7 is a diagram illustrating a structure of a GTS Bulk MAC PDI according to another exemplary embodiment.

Figure 1:
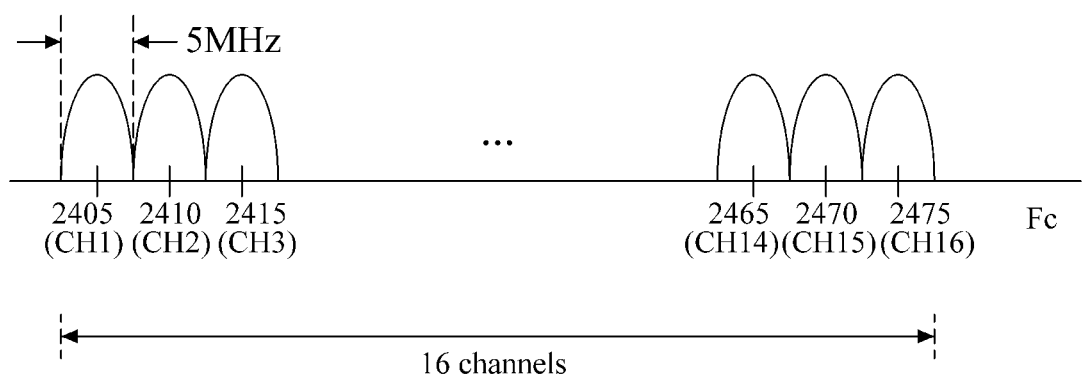
FIG. 1 is a diagram illustrating a configuration of IEEE802.15.4 channels.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

IEEE802.15.4 is a representative international standard for formation of a wireless sensor communication network, which defines an interface (it is referred to as "primitive") between PHY/MAC layer for low-power communications between sensors and an upper layer for application services. According to IEEE802.15.4, a throughput of 250 kbps, as a basic performance, is assured when an OQPSK modulation scheme is applied, and a basic channel coding mechanism is not included for low-power consumption.

FIG. 1 is a diagram illustrating a configuration of IEEE802.15.4 channels.

Referring to FIG. 1, according to IEEE802.15.4, 16 channels of 5-MHz width each, at 2.4 GHz band, are operable. It is possible to form a personal area network (PAN) for each channel, and one PAN becomes the basic unit of a sensor network. When a coordinator selects one channel and regularly transmits a beacon through the selected channel, devices in a coverage area of the beacon create a personal area network by joining the network.

FIG. 2 is a diagram illustrating an example of a configuration of a hierarchical sensor network.

Referring to FIG. 2, sensors of a wireless sensor network are connected to a server (not illustrated) connected to a wired Internet backbone network via a gateway GW 40. Personal area networks (PANs) 1 and 2 may be extended to a peer-to-peer (P2P) cluster tree topology. There may be several PANs 1 and 2 with different channels in overlapping coverage area.

The PANs 1 and 2 are managed by PAN coordinators 10-1 and 10-2 which are the highest level nodes connected to a gateway 40. The PAN coordinator 10-1 is linked with multiple sensors 30-1 and 30-2, or a relay coordinator 20-1. Similarly, the PAN coordinator 10-2 is linked with multiple sensors 31-1 and 31-2, or a relay coordinator 20-2. The relay coordinators may be linked with one or more sensors or another relay coordinator. For example, the relay coordinator 20-1 is linked with a sensor 32-1 and another relay coordinator 21-1, and the relay coordinator 20-2 is linked with a number of sensors 32-2 and 33-2. That is, one PAN is formed on one channel, and the channel is a radio resource shared among all sensors and coordinators within the same PAN and the PAN coordinator.

Figure 3:
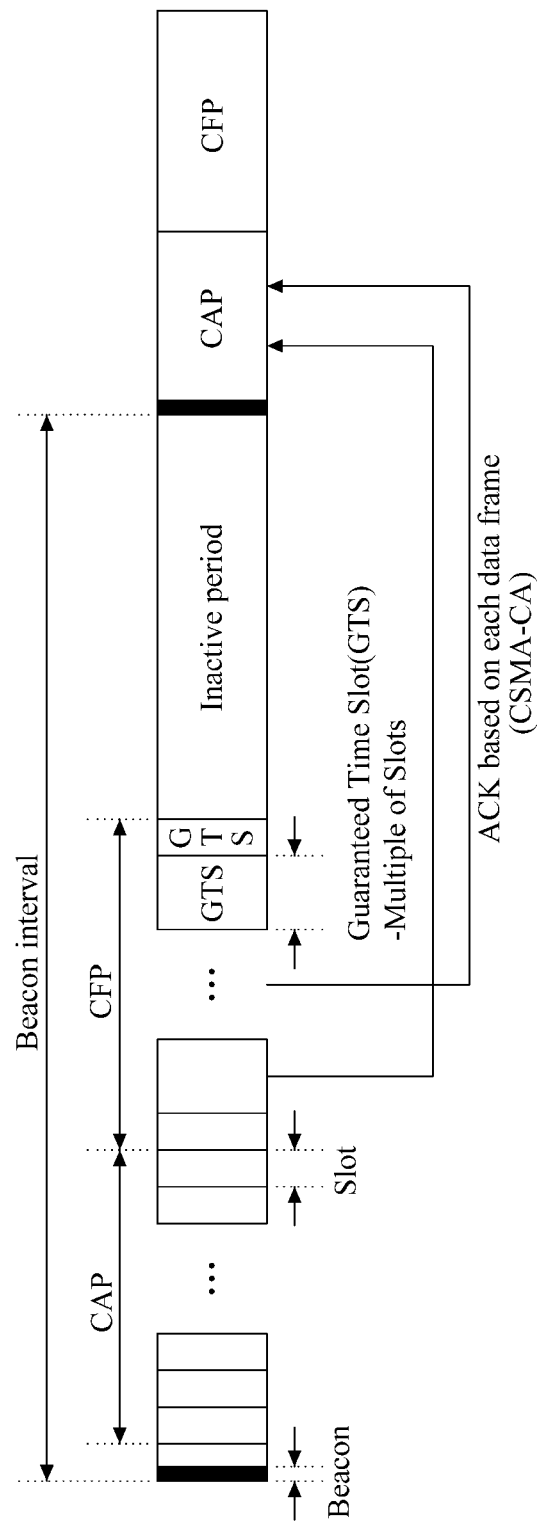
FIG. 3 is a diagram of a channel configuration to explain IEEE802.15.4 Guaranteed Time Slot (GTS) acknowledgement (ACK) scheme.

FIG. 3 is a diagram of a channel configuration to explain IEEE802.15.4 Guaranteed Time Slot (GTS) acknowledgement (ACK) scheme.

Referring to FIG. 3, one frame transmitted over one channel includes a beacon period, an active period and an inactive period. In the active period, communications between nodes take place, and in the inactive period, the nodes are allowed to enter sleep mode or standby mode, with the minimum power consumption.

Beacon frames are transmitted at regular time intervals, and a time interval between beacons constitutes one radio frame.

The active period is composed of Contention Access Period (CAP) and Contention Free Period (CFP). In the CAP, during which all sensors linked to the coordinator are allowed to transmit and receive data at any time, if transmissions from several sensors take place at the same time, data collisions may occur. On the contrary, in the CFP, a guaranteed time slot (GTS) is allocated to each sensor, and transmission collisions between the sensors can be avoided.

In the inactive period, where data transmission and reception is not allowed, all devices may disable a radio frequency (RF) functionality and be operated in power-saving mode.

In addition, guaranteed time slot acknowledgement (GTS ACK) may be operated based on contentions, using CSMA-CA scheme, during a CPA, and an ACK for each GTS transmission is performed during each GTS, so that a probability of occurrence of collisions is increased when using a CAP based on contentions. Therefore, ACK latency is caused, which leads to a latency delay in retransmission and increases the retransmission time. Further, a sensor device needs to stand by to receive ACKs independently transmitted by a coordinator during CAPs, thereby consuming a large amount of power.

Therefore, according to exemplary embodiments described herein, a GTS ACK mechanism capable of supporting low-latency retransmission by reducing signal overheader for retransmission, minimizing power consumption on standby to receive an ACK message, and at the same time avoiding possible collisions is provided.

Figure 4:
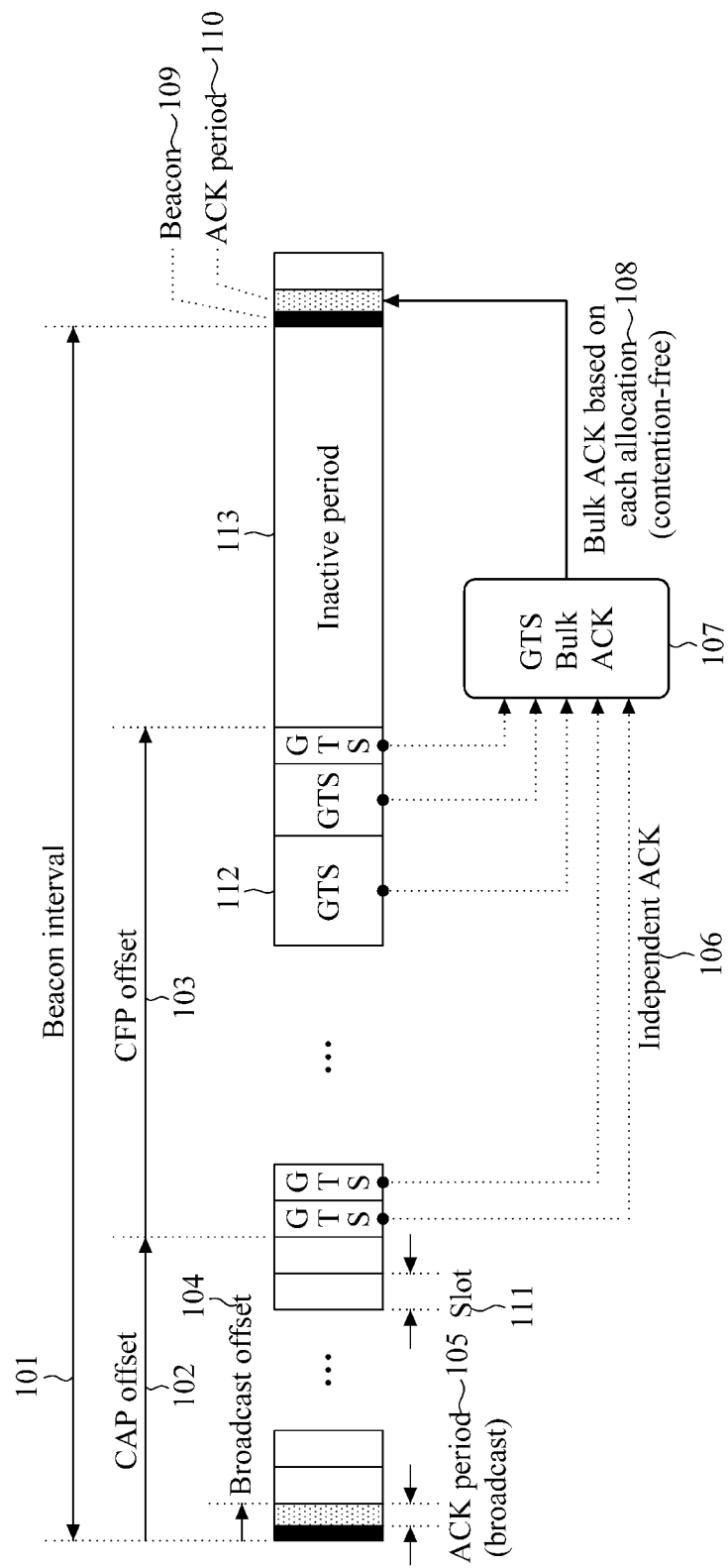
FIG. 4 is a diagram illustrating an example of a frame configuration in which GTS Bulk ACK information is sent in a frame different from a beacon.

FIG. 4 is a diagram illustrating a frame configuration of a GTS bulk acknowledgement scheme according to an exemplary embodiment.

Referring to FIG. 4, a beacon 109 transmitted by a coordinator is transmitted at a regular time interval 101. A transmission slot consists of basic slots 111, each of which is the basic unit of a CAP offset 102 and a CFP offset 103.

The CAP offset 102 is a basic slot 111 where a CAP ends within one frame, and the CFP offset 103 is a slot where a CFP following the last slot of the CAP ends. In the inactive period 113, all devices may disable transceiver RF functionality, and enter power-saving mode.

Each device is allocated a GTS 112 by the linked coordinator, and transmits packets through the allocated GTS. In ACK periods 105 and 110, an ACK is broadcast in response to data transmitted by each device during a previous frame, and ACKs 106 for the respective GTSs are combined in a GTS Bulk ACK frame 107 and the GTS Bulk ACK frame 107 is transmitted (broadcast) during the following ACK period. The GTS Bulk ACK may be transmitted in a packet that is different from a beacon, or sent in information of the beacon.

Figure 5:
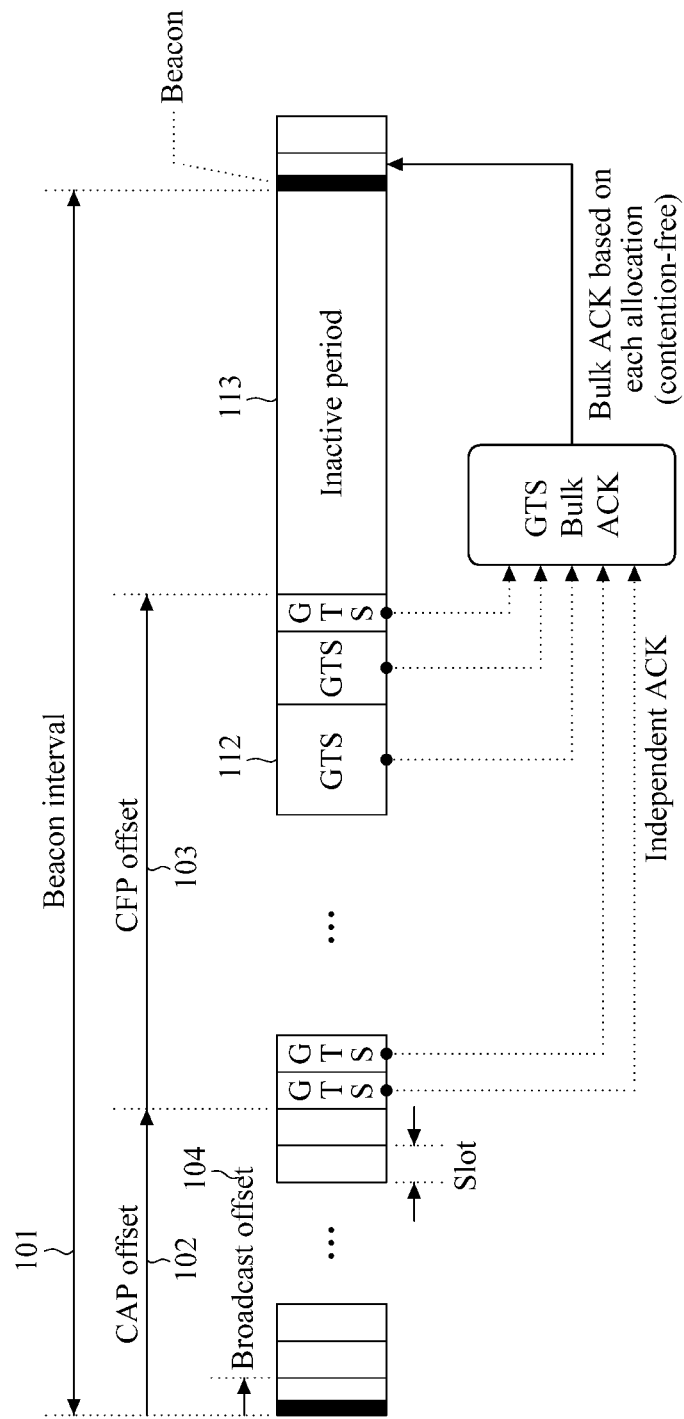
FIG. 5 is a diagram illustrating another example of a frame configuration in which the GTS Bulk ACK information is sent in a beacon.

In FIG. 4, the GTS Bulk ACK information is transmitted in a packet that is different from the beacon. FIG. 5 illustrates another example in which the GTS Bulk ACK information is sent in a beacon.

Figure 6:
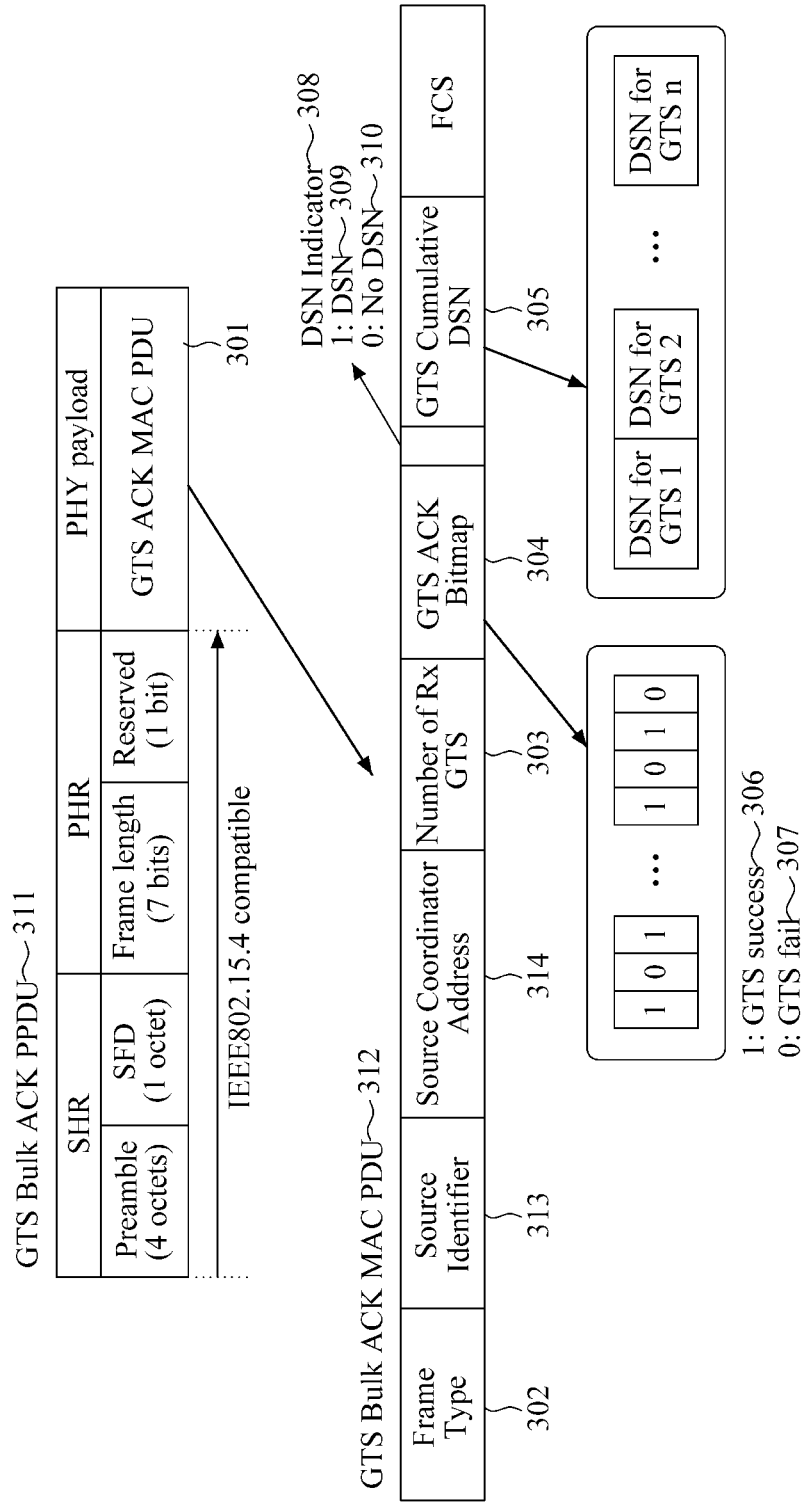
FIG. 6 is a diagram illustrating a packet data unit structure for sending GTS Bulk ACK information according to an exemplary embodiment.

FIG. 6 is a diagram illustrating a packet data unit structure for sending GTS Bulk ACK information according to an exemplary embodiment.

Referring to FIG. 6, SHR and PHR included in GTS Bulk ACK physical packet data unit (PPDU) 311 is compatible with IEEE802.15.4, and the GTS Bulk ACK PPDU 311 has GTS Bulk ACK MAC PDU 312 as a PHY payload.

Frame Type 302 included in the GTS Bulk ACK MAC PDU 312 designates a GTS Bulk ACK, and Source PAN Identifier 313 and Source Coordinator Address 314 indicate PAN IDs of coordinators that transmit GTS ACKs, respectively. Number of GTS 303 indicates the number of allocated GTSs, and GTS ACK Bitmap 304 includes bits, each of which represents ACK information of each ACK. Here, a bit value of "1" indicates success in receiving a packet transmitted in a GTS, and a bit value of "0" indicates failure of receiving the packet.

DSN Indicator 304 determines whether the GTS Bulk ACK MAC PDU contains Data Sequence Number (DSN) which has been successfully received from each device using a GTS. GTS Cumulative DSN 305 indicates a final value of continuous DSNs that have been successfully received from each device.

FIG. 7 is a diagram illustrating a structure of a GTS Bulk MAC PDI according to another exemplary embodiment.

Referring to FIG. 7, GTS Bulk MAC PDU 401, unlike the GTS Bulk ACK MAC PDU 312 of FIG. 6, does not include the DSN indicator 308 and the GTS Cumulative DSN 305. Accordingly, transmission overhead may be reduced.

However, the structures of the GTS Bulk ACK MAC PDU illustrated in FIGS. 6 and 7 are provided for purpose of examples only, and the aspects of the embodiment are not limited thereto.

Figure 8:
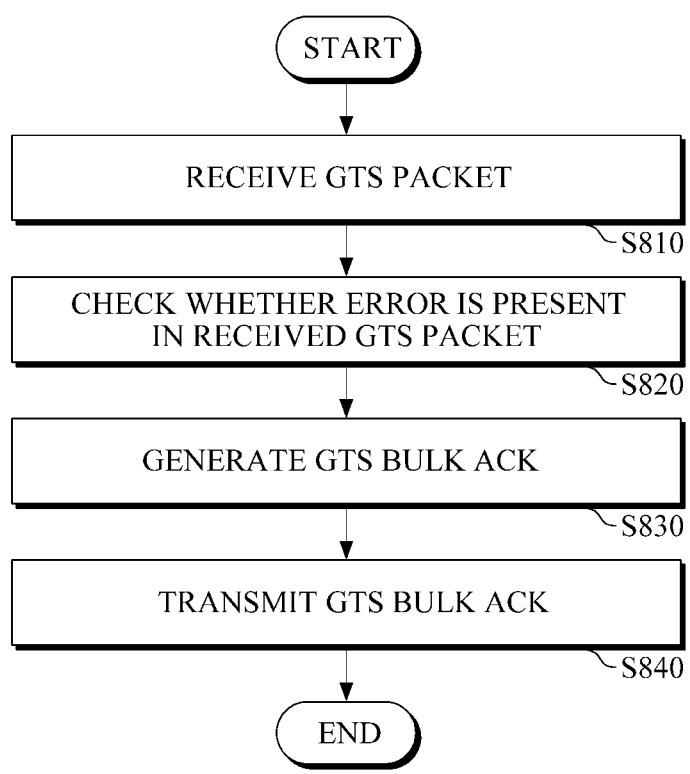
FIG. 8 is a flowchart illustrating a retransmission method of a coordinator for a low-power sensor communication.

FIG. 8 is a flowchart illustrating a retransmission method of a coordinator for a low-power sensor communication.

Referring to FIG. 8, a coordinator receives packets that a plurality of sensor devices have sent during their allocated GTS within a CFP offset in S810. Thereafter, the coordinator checks whether there is an error in each of the received packets in S820.

In S830, the coordinator creates GTS ACKs into one GTS Bulk ACK to send to each device in response to the error check results, by using a bitmap. The creation of the GTS Bulk ACK is as shown in FIGS. 6 and 7.

The coordinator sends the created GTS Bulk ACK to each device in S840 in two ways. As shown in FIG. 4, GTS Bulk ACK information may be transmitted in a packet that is different from a beacon, or as shown in FIG. 5, it may be sent in a beacon.

Figure 9:
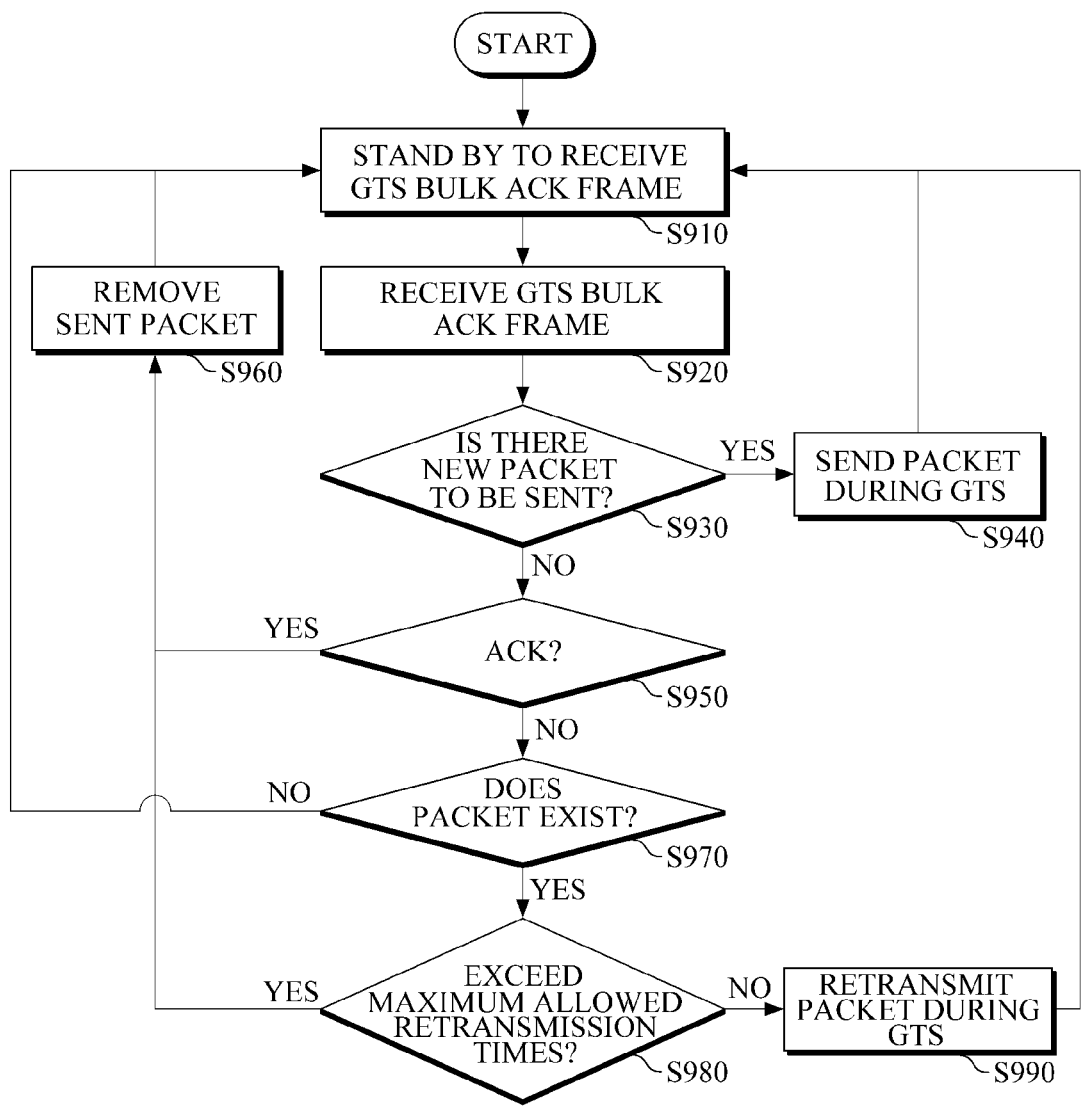
FIG. 9 is a flowchart illustrating a retransmission method of a sensor device for a low-power wireless sensor communication.

FIG. 9 is a flowchart illustrating a retransmission method of a sensor device for a low-power wireless sensor communication.

Referring to FIG. 9, a device stands by to receive a GTS Bulk ACK frame in S910, and receives the GTS Bulk ACK frame in S920.

In S930, the device determines whether there is another packet to send during GTSs allocated thereto. In response to a determination that there is a new packet to send, the device sends the packet during corresponding GTSs in S940. However, if it is determined that there is no another packet to send, the device determines whether a bitmap contained in the GTS Bulk ACK frame received in S920 indicates a GTS ACK in S950. In other words, the device determines whether the bitmap associated with the GTS period allocated thereto has a value of "1."

If it is determined in S950 that the GTS ACK has been received, there is no need to resend the packet, and thus in S960, the device removes the packet that has been already sent. However, if the determination is made in S960 that the GTS ACK has not been received, the device determines whether the relevant packet exists in a database in S970.

In response to a determination that the packet does not exists in the database, the flow proceeds to operation S910. If a determination is made in S970 that the relevant packet is present in the database, the device determines whether the packet has been sent more than the maximum allowed retransmission times in S980.

If the packet is determined as having been transmitted more than the maximum allowed retransmission times, the flow proceeds to operation S960. Otherwise, the device retransmits the packet during the allocated GTSs in S990.

Figure 10:
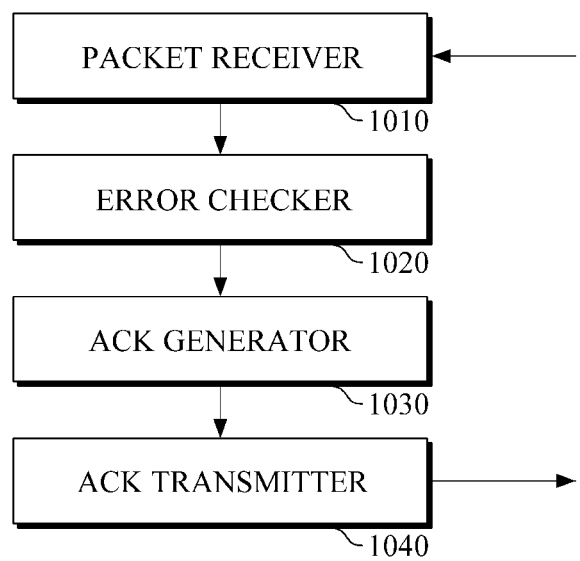
FIG. 10 is a diagram illustrating in detail a coordinator according to an exemplary embodiment.

FIG. 10 is a diagram illustrating in detail a coordinator according to an exemplary embodiment.

Referring to FIG. 10, the coordinator includes a packet receiver 1010, an error checker 1020, an ACK generator 1030, and an ACK transmitter 1040.

The packet receiver 1010 receives packets that a plurality of sensor devices have sent during their allocated GTS within a CFP offset.

The error checker 1020 checks whether there is an error in each of the received packets. The ACK generator 1030 generates one GTS Bulk ACK frame that contains ACK information to be transmitted to each device, according to the error check results.

The ACK transmitter 1040 transmits the GTS Bulk ACK frame to the plurality of sensor devices. The ACK transmitter 1070 may broadcast the GTS Bulk ACK frame to the plurality of devices. In addition, the ACK transmitter 1040 transmits the GTS Bulk ACK frame during a predetermined period within a CAP offset that is different from a beacon transmission period within the CAP offset, as shown in FIG. 4. In another example, the ACK transmitter 1040 transmits the GTS Bulk ACK frame included in the beacon as shown in FIG. 5.

The GTS Bulk ACK frame contains a GTS ACK Bitmap in which each bit represents ACK information with respect to each of the packets received during a plurality of GTSs. Descriptions related to this have been provided with reference to FIGS. 6 and 7.

Figure 11:
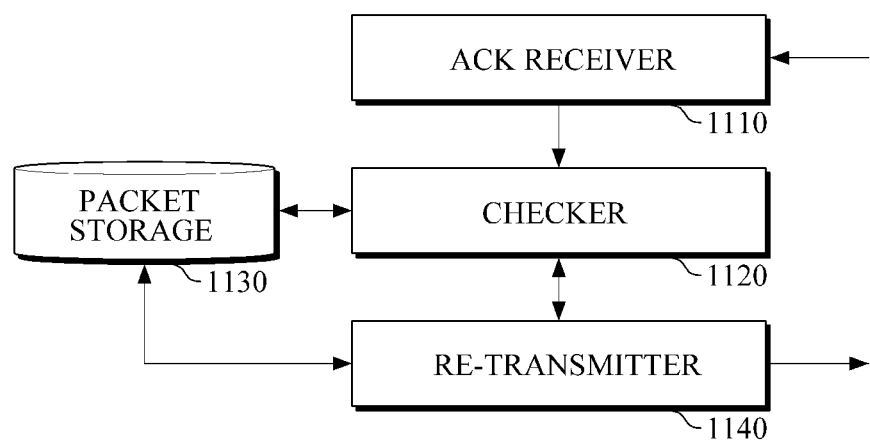
FIG. 11 is a diagram illustrating in detail a device according to an exemplary embodiment.

FIG. 11 is a diagram illustrating in detail a device according to an exemplary embodiment.

Referring to FIG. 11, a device includes an ACK receiver 1110, a checker 1120, and a re-transmitter 1140. In addition, the device further includes a packet storage 1130.

The ACK receiver 1110 receives one GTS Bulk ACK frame containing pieces of ACK information for a plurality of devices.

The checker 1120 checks the received GTS Bulk ACK frame to determine whether to retransmit a packet. The checker 1120 checks the received GTS Bulk ACK frame when there is no new packet to send during allocated GTSs.

If a determination is made that the packet does not need to be retransmitted, the checker 1120 removes the packet from the packet storage 1130.

In response to a determination that the packet needs to be retransmitted, the re-transmitter 1140 retransmits the packet during an allocated GTS within a CFP offset. In addition, the re-transmitter 1140 determines whether the packet has been transmitted more than the maximum allowed retransmission times, and only when the packet is determined as having been retransmitted less than the maximum allowed retransmission times, the re-transmitter 1140 retransmits the packet during the allocated GTS.

According to the exemplary embodiments as described above, it is possible to reduce signal over-header and, at the same time, avoid possible collisions, thereby enabling low-latency retransmission.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of retransmitting a packet for low-power wireless sensor communications, the method comprising:
   receiving packets from sensor devices during Guaranteed Time Slots (GTSs) of a Contention Free Period (CFP), wherein each of the sensor devices is allocated a GTS;
   checking, in each of the received packets, whether there is an error;
   generating, according to results of the error checking, a GTS Bulk acknowledgement (ACK) frame that contains ACK information to be transmitted to the respective sensor devices; and
   transmitting the generated GTS Bulk ACK frame to the sensor devices during a beacon transmission time slot within a Contention Access Period (CAP) offset, wherein the GTS Bulk ASK is transmitted either in a packet different from the beacon or in the beacon.

2. The method of claim 1, wherein the transmitting of the generated GTS Bulk ACK frame comprises broadcasting the generated GTS Bulk ACK frame to the sensor devices.

3. The method of claim 1, wherein the transmitting of the generated GTS Bulk ACK frame comprises transmitting the GTS Bulk ACK frame included in a beacon.

4. The method of claim 1, wherein the GTS Bulk ACK frame comprises a GTS ACK Bitmap including bits, wherein each bit represents ACK information corresponding to a packet received during the GTSs.

5. The method of claim 4, wherein the GTS Bulk ACK frame further comprises Data Sequence Number (DSN) indicator and GTS Cumulative DSN, wherein the DSN indicator includes information whether Data Sequence Number (DSN) which has been successfully received from each of the sensor devices using each GTS is contained in the GTS Bulk ACK frame and the GTS Cumulative DSN indicates a final value of continuous DSNs that have been successfully received from each of the sensor devices.

6. A method of retransmitting a packet for low-power wireless sensor communications, the method comprising:
   receiving a Guaranteed Time Slot (GTS) Bulk acknowledgement (ACK) frame containing ACK information transmitted to each of a plurality of devices during a beacon transmission time slot within a Contention Access Period (CAP) offset, wherein the GTS Bulk ASK is transmitted either in a packet different from the beacon or in the beacon;
   checking the received GTS Bulk ACK frame, and determining whether packet retransmission is required; and
   in response to a determination that packet retransmission is required, retransmitting a corresponding packet during an allocated GTS within a Contention Free Period (CFP) offset.

7. The method of claim 6, wherein the determining of whether packet retransmission is required comprises, in a case where there is no new packet to be sent during the allocated GTS, checking the received GTS Bulk ACK frame.

8. The method of claim 6, further comprising: in response to a determination that packet retransmission is not required, removing the corresponding packet.

9. The method of claim 6, wherein the retransmitting of the corresponding packet comprises determining whether the corresponding packet has been transmitted less than a maximum allowed retransmission times, and only in response to a determination that the corresponding packet has been transmitted less than the maximum allowed retransmission times, retransmitting the corresponding packet during the allocated GTS.

10. An apparatus for retransmitting a packet for low-power wireless sensor communications, the apparatus comprising:
   a packet receiver configured to receive packets transmitted from sensor devices during Guaranteed Time Slots (GTSs) of a Contention Free Period (CFP) offset, wherein each of the sensor devices is allocated a GTS;
   an error checker, executed by a processor, configured to check, in each of the received packets, whether there is an error;
   an acknowledgement (ACK) generator configured to, in response to a result of an error check, generate a GTS Bulk ACK frame containing ACK information to be transmitted to each of the sensor devices; and
   an ACK transmitter configured to transmit the generated GTS Bulk ACK frame to the sensor devices during a beacon transmission time slot within a Contention Access Period (CAP) offset, wherein the GTS Bulk ASK is transmitted either in a packet different from the beacon or in the beacon.

11. The apparatus of claim 10, wherein the ACK transmitter is configured to broadcast the generated GTS Bulk ACK frame to the sensor devices.

12. The apparatus of claim 10, wherein the ACK transmitter is configured to transmit the GTS Bulk ACK frame included in a beacon.

13. The apparatus of claim 10, wherein the GTS Bulk ACK frame comprises a GTS ACK Bitmap including bits, wherein each bit represents ACK information corresponding to a packet received during the GTSs.

14. An apparatus for retransmitting a packet for low-power wireless sensor communications, the apparatus comprising:
   an acknowledgement (ACK) receiver configured to receive a Guaranteed Time Slot (GTS) Bulk ACK frame containing ACK information transmitted to each of a plurality of devices during a beacon transmission time slot within a Contention Access Period (CAP)

offset, wherein the GTS Bulk ASK is transmitted either in a packet different from the beacon or in the beacon;

a checker, executed by a processor, configured to check the received GTS Bulk ACK frame, and determine whether packet retransmission is required; and a re-transmitter configured to, in response to a determination that packet retransmission is required, retransmit a corresponding packet during an allocated GTS within a Contention Free Period (CFP) offset.

15. The apparatus of claim 14, wherein the checker is configured to, in a case where there is no new packet to be transmitted during the allocated GTS, check the received GTS Bulk ACK frame.

16. The apparatus of claim 14, further comprising:

a packet storage;

wherein the checker is configured to, in response to a determination that packet retransmission is not required, remove the corresponding packet from the packet storage.

17. The apparatus of claim 14, wherein the re-transmitter is configured to determine whether the corresponding packet has been transmitted less than a maximum allowed retransmission times, and only in response to a determination that the corresponding packet has been transmitted less than the maximum allowed retransmission times, retransmit the corresponding packet during the allocated GTS.

* * * * *